April 14, 1964

H. C. SWIFT 3,128,849

AUTOMATIC BRAKE ADJUSTING MECHANISM

Filed Jan. 18, 1963

INVENTOR.
Harvey C. Swift.
BY
Karnes, Dickey & Pierce.
ATTORNEYS.

April 14, 1964      H. C. SWIFT      3,128,849
AUTOMATIC BRAKE ADJUSTING MECHANISM
Filed Jan. 18, 1963      2 Sheets-Sheet 2
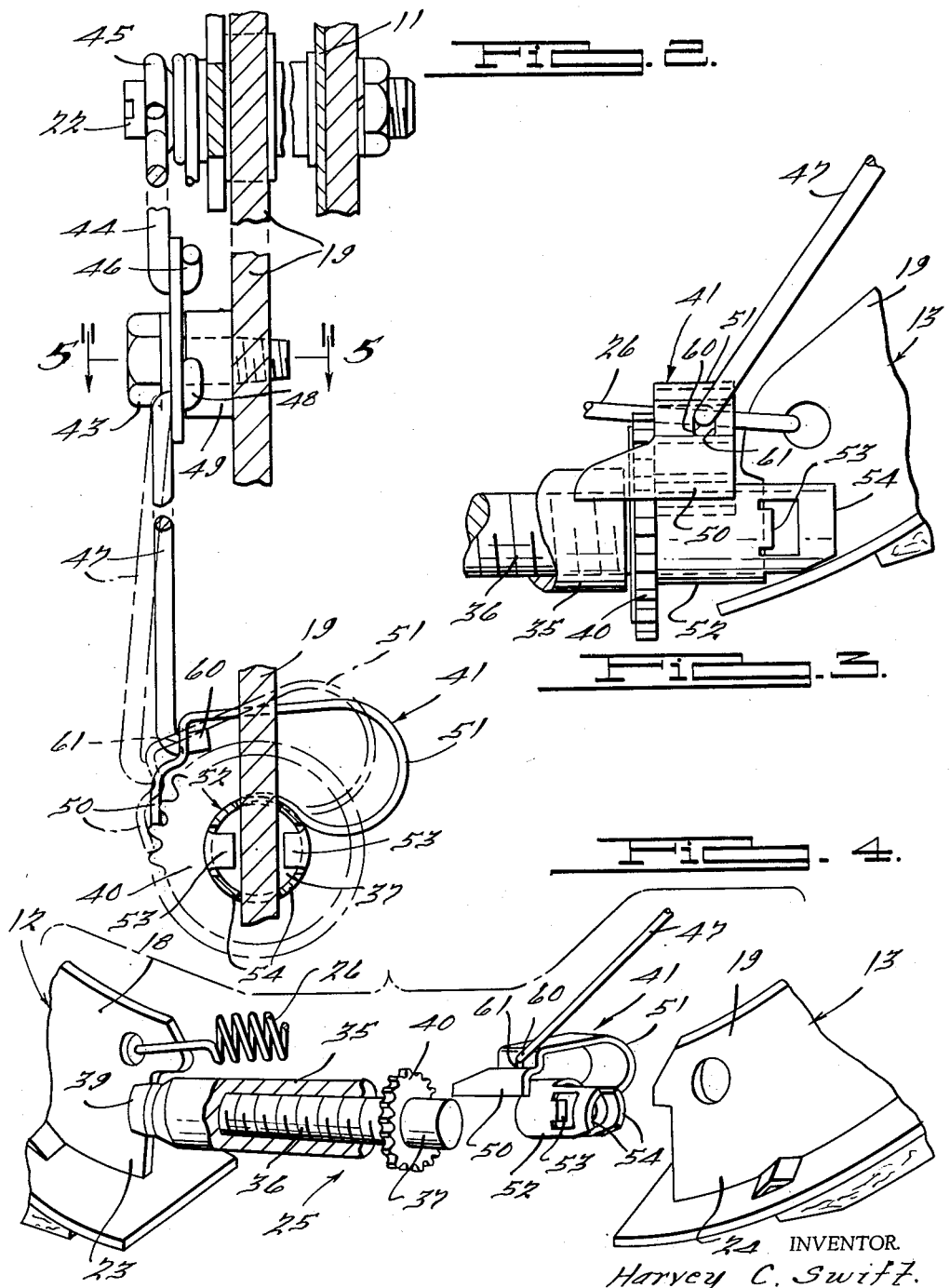
INVENTOR.
Harvey C. Swift.
BY
Harness, Dickey & Pierce
ATTORNEYS United States Patent Office 3,128,849
Patented Apr. 14, 1964

3,128,849
AUTOMATIC BRAKE ADJUSTING MECHANISM
Harvey C. Swift, Birmingham, Mich., assignor to Kelsey-Hayes Company, Romulus, Mich., a corporation of Delaware
Filed Jan. 18, 1963, Ser. No. 252,372
4 Claims. (Cl. 188—79.5)

This invention relates to brakes of the type comprising an annular brake drum and arcuate brake shoes and, more particularly, to means for automatically adjusting the brakes responsively to wear on the brake shoes thereof.

A principal object of this invention is to provide an automatic adjuster for the brake shoes which is so reduced in the number and character of its component parts as to approach the practical limits of structural simplicity.

Another object of the invention is to provide a device of this type wherein the structural simplicity of the brake adjusting means produces a substantial economy in its manufacturing, installation and maintenance costs.

It is also an object of the invention to provide an adjuster of this type in which the srtucture comprises a minimum number of stampings and other simple parts which may be economically manufactured and easily assembled. Furthermore, the adjuster is so constructed that it may be installed on a brake which was not originally adapted for the invention.

A further object of the invention is to provide automatic adjusting means of this type which is rendered operative only when the vehicle is moving in a reverse direction and which does not interfere with the normal operation of the brake during the forward movement of the vehicle.

The various objects and advantages, and the novel details of construction of one commercially practical embodiment of the invention, will become more apparent as this description proceeds, especially when considered in connection with the accompanying drawings, in which:

FIGURE 3 is an enlarged fragmentary elevational view of the adjusting mechanism;

FIGURE 4 is a detail separated perspective view of a portion of the adjusting mechanism; and FIGURE 5 is a detail sectional view showing the pivot for the bellcrank, taken on line 5—5 in FIGURE 2.

Figure 1:
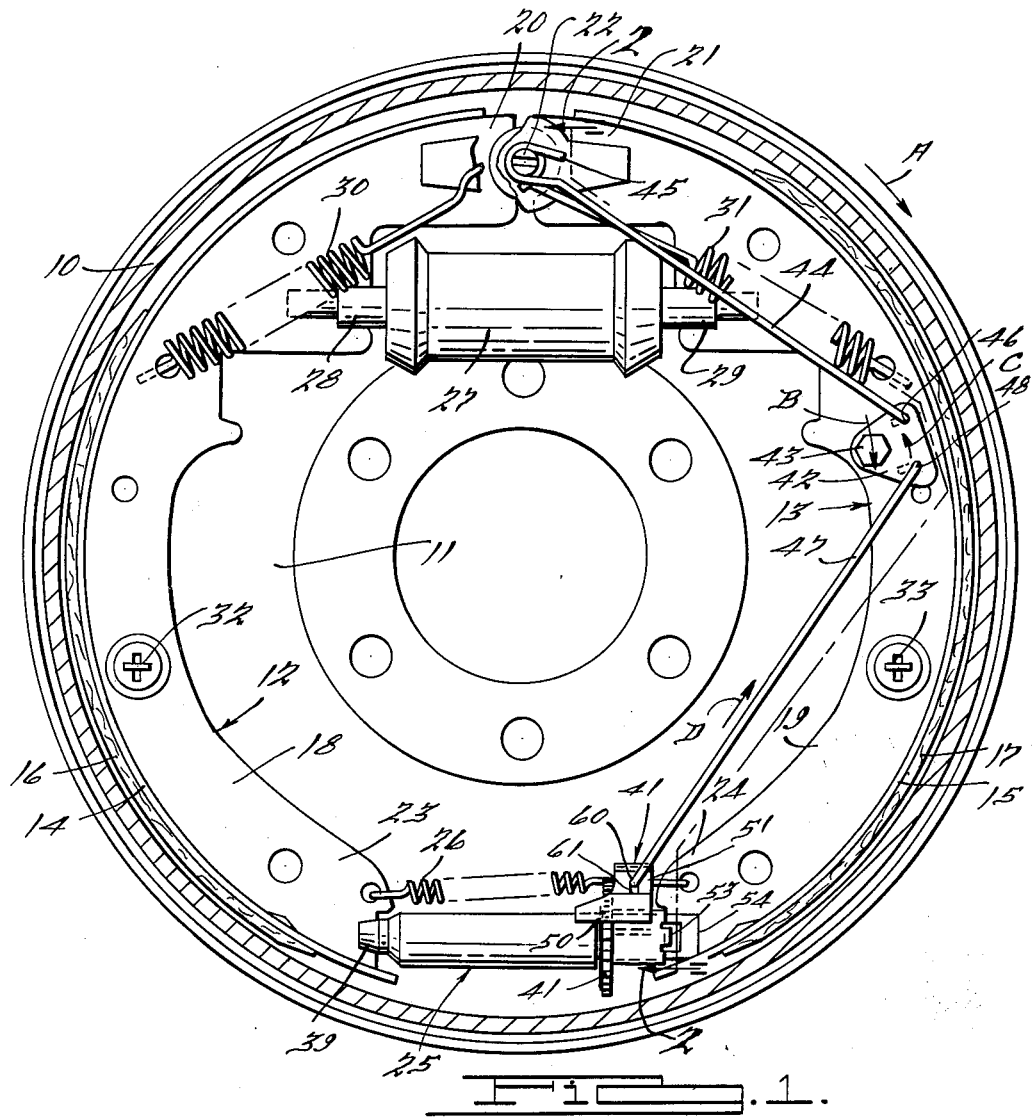
FIGURE 1 is a plan view of a brake assembly showing the device of this invention incorporated therein.

The illustrative embodiment of the invention is shown in the drawings as applied to a brake structure of the internal expanding type comprising arcuate brake shoes adapted to cooperate with the inner surfaces of the brake drum. In FIGURE 1, the reference character 10 indicates a brake drum mounted on the wheel hub of the vehicle (not shown) for rotation therewith. A stationary backing plate 11 is mounted on a stationary part (not shown) of the vehicle.

The basic elements of the brake structure comprise a pair of brake shoes 12 and 13 in the form of arcuate segments, said brake shoes being provided with arcuate rim portions 14 and 15 supporting lining elements 16 and 17, respectively. The rim portions 14 and 15 are reinforced against flexure by web portions 18 and 19 extending perpendicularly from the rim portions 14 and 15.

The adjacent ends 20 and 21 of the brake shoes 12 and 13 engage an anchor pin 22 fixed to the backing plate 11. The opposite adjacent ends 23 and 24 of the brake shoes 12 and 13 engage an adjusting strut 25, with the shoe ends 23 and 24 being retained in engagement with the adjusting strut by means of a tension spring 26.

A hydraulic wheel cylinder 27 having plunger members 28 and 29 extending from opposite ends thereof into engagement with the webs 18 and 19 provides the actuating device for moving the brake shoes 12 and 13 into engagement with the brake drum 10. The plunger members 28 and 29 extend from piston members (not shown) within the wheel cylinder 27, hydraulic fluid being delivered into the wheel cylinder between the piston members from a conventional pedal operated master cylinder (not shown). Retraction springs 30 and 31 normally retain the ends 20 and 21 of the brake shoes in engagement with the anchor pin 22 when hydraulic pressure is released from the wheel cylinder 27. The brake shoes 12 and 13 are resiliently urged into engagement with the backing plate 11 by conventional spring assemblies 32 and 33.

In the type of brake thus far described, it will be understood that the brake shoe 13 constitutes the secondary shoe and that this shoe moves away from the anchor pin 22 when the brake is applied while the vehicle is moving in reverse and the brake drum is moving in the direction of arrow A in FIGURE 1. As will be explained more fully hereinafter, the means for adjusting the brake shoes is initially operated or set only when the brake is applied while the vehicle is moving in a reverse direction.

The adjustable strut for adjusting the brake shoes, indicated generally by the reference character 25, comprises a tubular internally threaded nut 35 which receives the threaded stem 36 of the adjusting portion of the strut. The stem 36 has a nonthreaded end portion 37. The other end 39 of the nut 35 is slotted or bifurcated to receive the end 23 of the web 18 of the brake shoe 12, thus preventing rotation of the nut 35. A toothed wheel 40 is formed integrally with the stem 36 and the teeth of this toothed wheel provide a ratchet surface for turning the toothed wheel 40.

The structure thus far described is substantially conventional in modern-day brakes and the present invention relates to means for adjusting the adjustable strut 25 automatically.

The adjusting mechanism comprises a unitary spring device indicated generally by the reference character 41. This adjusting member is actuated by a mechanism carried by the secondary shoe 13 which comprises a bellcrank lever 42 in the form of a flat plane pivotally connected to the web 19 of the brake shoe 13, as at 43.

A rod 44 has a hooked end 45 which engages the anchor 22 and the other end of this rod 44 has a hooked end 46 which engages an aperture in the bellcrank lever 42. Also connected to the bellcrank lever 42 is a second rod 47 which has a hooked end 48 engaging an aperture in the bellcrank lever 42.

A simple way for conveniently mounting the bellcrank 42 on the web 19 of the adjacent brake shoe 13 consists of forming the pivot 43 of a self-capping screw having a threaded portion 43a engaging the backing plate. Pressed on the screw is a spacer sleeve 49 which abuts the web 19 and is spaced from the bellcrank lever 42 to provide a clearance 49a so that the bellcrank may oscillate freely; see particularly FIGURE 5.

When the brakes are applied and the vehicle is moving in a reverse direction, the brake shoe 13 moves away from the anchor pin 22 to move the pivot 43 in the direction of arrow B. This will rock the bellcrank 42 in the direction of arrow C to move the link or second rod 47 in the direction of arrow D to move or actuate the adjusting means.

As stated, the adjusting means consists of a unitary spring device 41 having a portion 50 thereof serving as a pawl. The pawl 50 is formed on the end of a spring arm 51 which is carried by a tubular or sleeve-like body portion 52. The sleeve-like body portion 52 is adapted to be telescoped over the unthreaded end 37 of the stem 36 and thus be mounted on the adjusting strut. The sleeve-like body portion 52 is provided with laterally, inwardly extending tabs or lugs 53 which may conveniently be formed by lancing or slitting the body portion 52 and turning the tabs or lugs inwardly, as shown best in FIGURES 2 and 4. These tabs engage the end of the nonthreaded portion 37 of the stem 36 to limit movement of the spring device in one direction. The body portion 52 is provided with bifurcations 54 which straddle or embrace the web 19 of the adjacent end 24 of the brake shoe 13. This prevents the spring device from rotating on the nonthreaded portion 37.

When the spring device 41 is placed on the nonthreaded portion 37 of the adjustable strut, the tabs or lugs 53 will engage the end of the portion 37 and when the bifurcated ends engage the web of the adjacent brake shoe and the tension spring 26 is secured in place, the spring device will be held in properly assembled position in connection with the adjustable strut and the surrounding structure.

The end 60 of the second link or rod 47 engages a slot 61 formed in the spring device so as to provide a lost motion connection between these parts. This lost motion connection permits the application of the brakes during the forward movement of the vehicle without actuating the adjusting mechanism.

Figure 2:
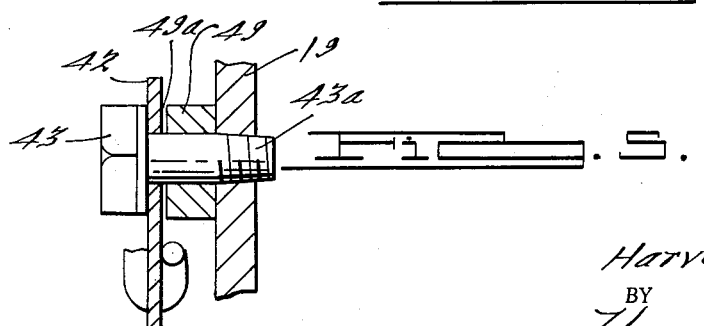
FIGURE 2 is an enlarged vertical sectional elevational view, partly broken away, taken substantially on the plane indicated by line 2—2 in FIGURE 1.

When the rod or link 47 is moved in the direction of arrow D (FIGURE 1) upon application of the brakes while the vehicle is moving in a reverse direction, the spring arm 51 will be moved from its dotted line position to its full line position, as shown in FIGURE 2, thus loading the spring device.

This loaded spring serves to urge the detent 50 in a downward direction, as viewed in FIGURE 2 to thereby adjustably rotate the toothed wheel 40 when the brake is released and the secondary shoe is retracted to the position in which it engages the anchor 22. This rotation of the toothed wheel 40 will extend the strut member 25 to adjust both brake shoes outwardly toward the brake drum.

The loading of the spring arm 51 is independent of the movement of the brake shoe, so that the loading of this spring does not affect the pedal pressure required to apply the brakes.

It will be understood that the movement of the rod 47 in a direction opposite to that indicated by arrow D in FIGURE 1 also tends to move the spring device in a direction to adjust the toothed wheel.

It will be apparent from the above description of the device that automatic adjusting means is provided for the brake which is so reduced in the number and character of its component parts as to approach the practical limits of structural simplicity.

The spring 44 may be formed as a unit and readily assembled with the adjusting strut and the adjacent brake shoe. This is accomplished by slipping the sleeve-like body member 52 over the nonthreaded end of the stem 36 and engaging the bifurcations 54 with the web of the adjacent brake shoe. The tabs or lugs 53 limit movement of the spring device in one direction and the engagement of the bifurcations 54 with the web of the brake shoe limits its movement in the opposite direction and prevents rotation of the spring device.

Inasmuch as the device comprises a minimum number of simple parts, it may be manufactured, installed and maintained at a minimum cost.

While one commercially practical embodiment of the invention has been described and illustrated herein somewhat in detail, it will be understood that various changes may be made as may come within the purview of the accompanying claims.

What is claimed is:

1. In an adjusting means for a brake mechanism comprising first and second brake shoes, a brake drum, an anchor, means for moving said brake shoes away from said anchor and into engagement with said brake drum, an extensible strut connecting adjacent ends of said shoes, and a rotatable toothed wheel which controls the extension of said strut, that improvement which comprises, a unitary spring device comprising a portion functioning as a pawl, a sleeve-like portion engaging said strut and a bifurcated portion engaging the web at the end of the adjacent brake shoe to nonrotatably hold said spring device on said strut, and operating means for said pawl mounted on said second shoe and connected to said anchor whereby movement of said second shoe into brake applying position moves said pawl in one direction to engage a successive portion of said toothed wheel and loads said spring device, whereupon said spring device serves to urge said pawl to its original position to thereby adjustably rotate said toothed wheel when the brake is released and said shoe is retracted.

2. In a brake mechanism comprising first and second brake shoes, a brake drum, an anchor, means for moving said brake shoes away from said anchor and into engagement with said brake drum, an extensible strut connecting adjacent ends of said shoes, and a rotatable toothed wheel which controls the extension of said strut, that improvement which comprises, a brake adjusting means comprising a unitary spring device mounted on said strut and having a portion functioning as a pawl to engage said toothed wheel to rotate the same, said spring device including a sleeve-like body, one end of said sleeve-like body surrounding said strut to support the spring device thereon, the other end being bifurcated to engage the web of the adjacent brake shoe, and means translating brake applying movement of one shoe into movement of said pawl in one direction to engage a successive portion of said toothed wheel and to load said spring device, said spring device, when loaded, serving to adjustably rotate said toothed wheel when the brake is released and said shoe is retracted.

3. In a brake mechanism comprising first and second brake shoes, a brake drum, an anchor, means for moving said brake shoes away from said anchor and into engagement with said brake drum, an extensible strut connecting adjacent ends of said shoes, and a rotatable toothed wheel which controls the extension of said strut, that improvement which comprises, a brake adjusting means comprising a unitary spring device mounted on said strut and having a portion functioning as a pawl to engage said toothed wheel to rotate the same, said spring device comprising a sleeve-like body surrounding an end of said strut to support the spring device thereon, said sleeve-like body having a projecting bifurcated end adapted to engage the web of the adjacent brake shoe to nonrotatably hold said spring device on said strut, and means translating brake applying movement of one shoe into movement of said pawl in one direction to engage a successive portion of said toothed wheel and to load said spring device, said spring device, when loaded, serving to adjustably rotate said toothed wheel when the brake is released and said shoe is retracted.

4. In a brake mechanism comprising first and second brake shoes, a brake drum, an anchor, means for moving said brake shoes away from said anchor and into engagement with said brake drum, an extensible strut connecting adjacent ends of said shoes, and a rotatable toothed wheel which controls the extension of said strut, that improvement which comprises, a brake adjusting means comprising a unitary spring device mounted on said strut and having a portion functioning as a pawl to engage said toothed wheel to rotate the same, said spring device comprising a sleeve-like body surrounding an end of said strut to support the spring device thereon, said sleeve-like body having a projecting bifurcated end adapted to engage the web of the adjacent brake shoe to nonrotatably hold said spring device on said strut, said sleeve-like body being provided with an inwardly extending integral tongue formed from the material of said body and adapted to engage the end of the strut to limit movement of the sleeve-like body on the strut in one direction, and means translating brake applying movement of one shoe into movement of said pawl in one direction to engage a successive portion of said toothed wheel and to load said spring device, said spring device, when loaded, serving to adjustably rotate said toothed wheel when the brake is released and said shoe is retracted.

References Cited in the file of this patent
UNITED STATES PATENTS

| | | |
|---|---|---|
| 2,748,901 | Brooks | June 5, 1956 |
| 2,938,610 | Dombeck et al. | May 31, 1960 |
| 2,978,072 | Burnett | Apr. 4, 1961 |